(12) United States Patent
Wang et al.

(10) Patent No.: US 9,354,696 B2
(45) Date of Patent: May 31, 2016

(54) CREDIT BASED POWER MANAGEMENT

(75) Inventors: Ren Wang, Portland, OR (US);
Tsung-Yuan C. Tai, Portland, OR (US);
Jr-Shian Tsai, Portland, OR (US);
Christian Maciocco, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 343 days.

(21) Appl. No.: 13/995,227

(22) PCT Filed: Sep. 30, 2011

(86) PCT No.: PCT/US2011/054466
§ 371 (c)(1),
(2), (4) Date: Jun. 18, 2013

(87) PCT Pub. No.: WO2013/048517
PCT Pub. Date: Apr. 4, 2013

(65) Prior Publication Data
US 2013/0275789 A1    Oct. 17, 2013

(51) Int. Cl.
*G06F 1/26* (2006.01)
*G06F 1/32* (2006.01)
*H04L 12/12* (2006.01)
*H04L 12/815* (2013.01)
(Continued)

(52) U.S. Cl.
CPC ............ *G06F 1/3296* (2013.01); *G06F 1/3209* (2013.01); *H04L 12/12* (2013.01); *H04L 47/22* (2013.01); *H04L 47/28* (2013.01); *H04L 47/39* (2013.01); *Y02B 60/32* (2013.01); *Y02B 60/34* (2013.01)

(58) Field of Classification Search
CPC ........ G06F 1/3209; H04L 12/12; H04L 47/28
See application file for complete search history.

(56) References Cited

U.S. PATENT DOCUMENTS 6,766,223 B1    7/2004    Motoyama
6,850,539 B1    2/2005    Cassiers et al.
(Continued)

FOREIGN PATENT DOCUMENTS

WO    2010029132 A1    3/2010
WO    2013/048517 A1    4/2013

OTHER PUBLICATIONS

International Preliminary Report on Patentability and Written Opinion received for PCT Patent Application No. PCT/US2011/054466, mailed on Apr. 10, 2014, 6 pages.
International Search report and Written Opinion received for PCT Patent Application No. PCT/US2011/054466, mailed on Apr. 18, 2012, 9 pages.
(Continued)

*Primary Examiner* — Mohammed Rehman
*Assistant Examiner* — Gayathri Sampath
(74) *Attorney, Agent, or Firm* — Christopher K. Gagne

(57) ABSTRACT

An embodiment may include circuitry to determine whether to issue at least one credit to at least one sender of at least one packet. The credit(s) may be to grant permission to the at least one sender to issue the at least one packet to at least one receiver of the at least one packet. The determination of whether to issue the credit(s) may be based, at least in part, upon whether a time in which the at least one receiver is in a relatively lower power state prior to issuance of the credit(s) is at least sufficient to provide at least a predetermined amount of reduction in power consumption. The relatively lower power state may be relative to a relatively higher power state of the at least one receiver that prevails at the issuance of the credit(s). Additionally or alternatively, the circuitry may be to receive such credit(s).

42 Claims, 4 Drawing Sheets

(51) Int. Cl.
*H04L 12/801* (2013.01)
*H04L 12/841* (2013.01)

(56) References Cited

U.S. PATENT DOCUMENTS

| | | | |
|---|---|---|---|
| 2005/0070340 A1* | 3/2005 | Kim | 455/574 |
| 2005/0221869 A1* | 10/2005 | Liu et al. | 455/574 |
| 2006/0218426 A1 | 9/2006 | Gutman et al. | |
| 2007/0174344 A1* | 7/2007 | Goh | G06F 1/3203 |
| 2007/0183355 A1* | 8/2007 | Kuchibhotla et al. | 370/318 |
| 2009/0077394 A1 | 3/2009 | Tsai et al. | |
| 2010/0303044 A1 | 12/2010 | Beiroumi | |
| 2011/0022716 A1* | 1/2011 | Diab | 709/231 |
| 2011/0038290 A1 | 2/2011 | Gong | |

OTHER PUBLICATIONS

Reviriego, et al., "An Initial Evaluation of Energy Efficient Ethernet", IEEE Communications Letters, vol. 15, No. 5, May 2011, pp. 578-580.

IEEE Computer Society, "Part 3: Carrier Sense Multiple Access with Collision Detection (CSMA/CD) Access Method and Physical Layer Specifications", Amendment 5: Media Access Control Parameters, Physical Layers, and Management Parameters for Energy-Efficient Ethernet, pp. 302.

Extended European Search Report for EP application 11873412.8, mailed on Feb. 20, 2015, 6 pages.

Office Action dated Mar. 28, 2016 in Chinese Patent Application No. 201180073837.3 (7 pages, with 7 pages of summarized English translation).

* cited by examiner

CREDIT BASED POWER MANAGEMENT

FIELD

This disclosure relates to credit based power management.

BACKGROUND

In one conventional network arrangement, a first computer system may be coupled via a network to a second computer system. In order to try to avoid receive buffer overflow and packet loss at the second computer system, a credit based flow control scheme is employed in the conventional network arrangement. According to this scheme, it is a precondition to being eligible to transmit to the second computer system that the first computer system be granted permission to make such a transmission. In this scheme, the second computer system grants such permission by transmitting a requisite number of flow control credits to the first computer system.

In this conventional arrangement, the first computer system is free to transmit to the second computer system whenever the first computer system has been granted the requisite number of credits to make the transmission, and the grant of such credits is made based upon fill status of the second computer system's receive buffer, without regard to power consumption considerations. This may result in the first computer system's transmissions to the second computer system being essentially randomly dispersed and/or distributed in time. This may effectively prevent the second computer system from being able to enter and/or remain in a relatively low power state (e.g., relative to a fully powered-on state that is suitable for receipt of transmissions) without risking and/or encountering transmission loss. This may result in increased power consumption and/or increased risk of transmission loss.

BRIEF DESCRIPTION OF THE SEVERAL VIEWS OF THE DRAWINGS

Features and advantages of embodiments will become apparent as the following Detailed Description proceeds, and upon reference to the Drawings, wherein like numerals depict like parts, and in which.

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
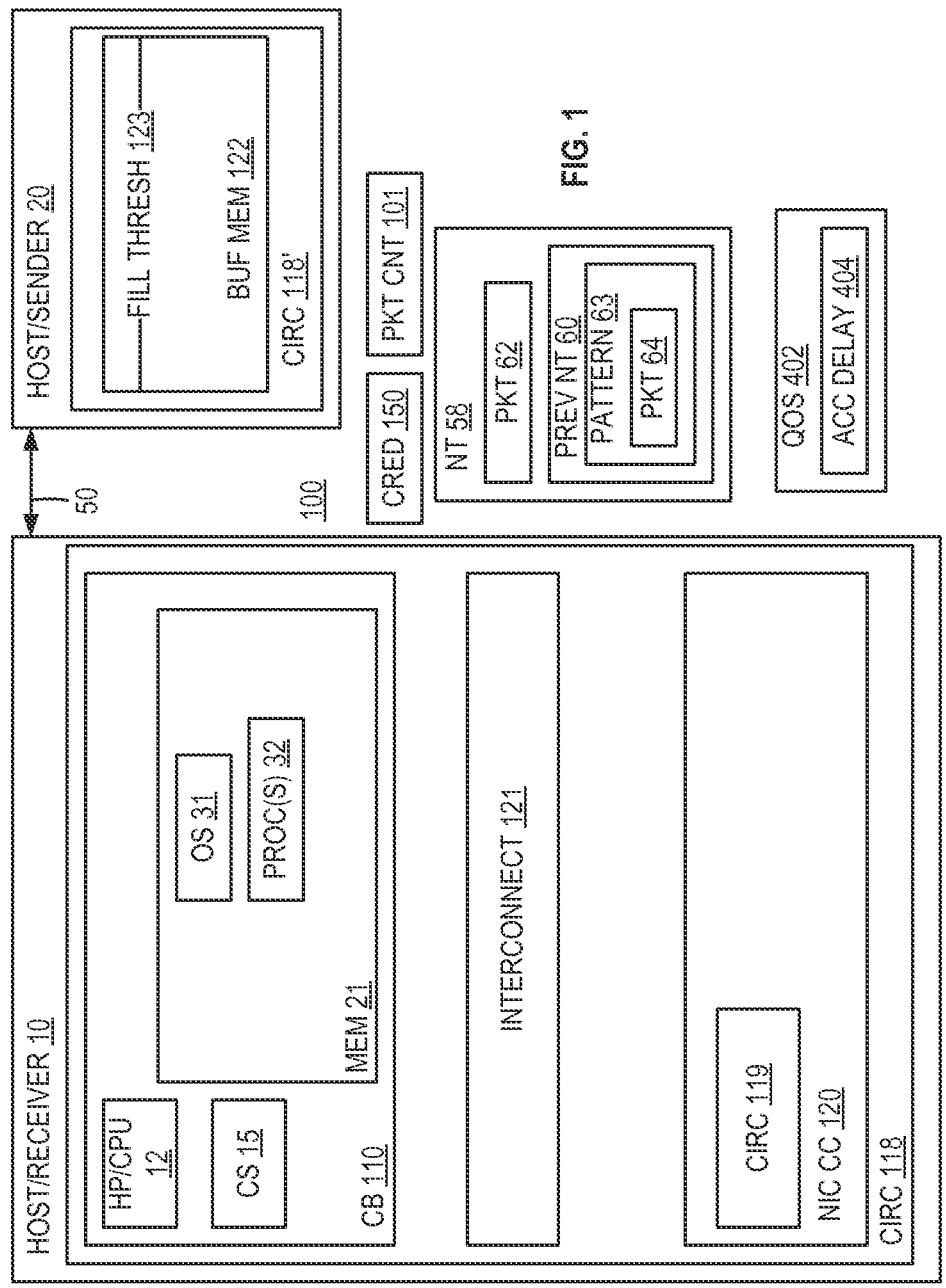
FIG. 1 illustrates a system embodiment.

FIG. 1 illustrates a system embodiment 100. System 100 may include one or more hosts 10 that may be communicatively coupled to one or more other hosts 20 via one or more wireless and/or wired network communication links 50. In this embodiment, one or more hosts 10 may be or comprise one or more intended receivers of network traffic (NT) 58, and/or one or more hosts 20 may be or comprise one or more senders of network traffic 58.

In this embodiment, one or more hosts 10 and/or 20 may be geographically remote from each other. In an embodiment, the terms "host computer," "host," "server," "client," "network node," "end station," "intermediate station," and "node" may be used interchangeably, and may mean, for example, without limitation, one or more end stations, mobile internet devices, smart phones, media (e.g., audio and/or video) devices, input/output (I/O) devices, tablet computers, appliances, intermediate stations, network interfaces, clients, servers, and/or portions thereof. Also in this embodiment, a "sender" may be capable, at least in part, of transmitting, at least in part, one or more packets to one or more "receivers," and a "receiver" may be capable, at least in part, of receiving, at least in part, the one or more packets. In this embodiment, a packet may comprise one or more symbols and/or values.

In this embodiment, a "network" may be or comprise any mechanism, instrumentality, modality, and/or portion thereof that may permit, facilitate, and/or allow, at least in part, two or more entities to be communicatively coupled together. Also in this embodiment, a first entity may be "communicatively coupled" to a second entity if the first entity is capable of transmitting to and/or receiving from the second entity one or more commands and/or data. In this embodiment, a "wireless network" may mean a network that permits, at least in part, at least two entities to be wirelessly communicatively coupled, at least in part. In this embodiment, a "wired network" may mean a network that permits, at least in part, at least two entities to be communicatively coupled, at least in part, non-wirelessly. In this embodiment, data and information may be used interchangeably, and may be or comprise one or more commands (for example one or more program instructions), and/or one or more such commands may be or comprise data and/or information. Also in this embodiment, an "instruction" may include data and/or one or more commands.

One or more hosts 10 may comprise circuitry 118. Circuitry 118 may comprise circuit board (CB) 110 and one or more network interface controller (NIC) circuit cards (CC) 120. In this embodiment, CB 110 may comprise, for example, a system motherboard that may be physically and communicatively coupled to one or more NIC CC 120 via a not shown bus connector/slot system. CB 110 may comprise one or more single and/or multi-core host processors (HP)/central processing units (CPU) 12 and computer-readable/writable memory 21. CB 110 also may comprise one or more chipsets (CS) 15 which may comprise, e.g., memory, I/O controller circuitry, and/or network interface controller circuitry. One or more host processors 12 may be communicatively coupled via the one or more chipsets 15 to memory 21 and CC 120. CC 120 may comprise I/O circuitry 119. I/O circuitry 119 may be or comprise, for example, storage, network interface, and/or other I/O controller circuitry.

Alternatively or additionally, although not shown in the Figures, some or all of I/O circuitry 119 and/or the functionality and components thereof may be comprised in, for example, CB 110 (e.g., in one or more host processors 12 and/or the one or more chipsets 15). Also alternatively, one or more host processors 12, memory 21, the one or more chipsets 15, and/or some or all of the functionality and/or components thereof may be comprised in, for example, I/O circuitry 119 and/or one or more CC 120. Many other alternatives are possible without departing from this embodiment.

One or more hosts 20 may comprise circuitry 118'. Circuitry 118' and/or one or more hosts 10 may comprise respective components that may be respectively identical or substantially similar to the respective components of circuitry 118 and/or one or more hosts 10, for example, in terms of their respective constructions, operations, and/or capabilities. Of course, alternatively, without departing from this embodiment, the respective construction, operation, and/or capabilities of one or more hosts 20 (and/or one or more components thereof) may differ, at least in part, from the respective construction, operation, and/or capabilities of one or more hosts 10 (and/or one or more components thereof). For purposes of clarity of illustration, the respective components of circuitry 118' and/or one or more hosts 20 are not shown in FIG. 1, with the exception of buffer memory 122. Buffer memory 122 may be to receive and/or store, at least temporarily, one or more packets (e.g., one or more packets 62 to be comprised in network traffic 58) that may be generated, at least in part, by one or more hosts 20. Additionally or alternatively, these one or more packets 62 may be received by one or more hosts 20 from one or more other, not shown hosts via one or more other, not shown network communication links.

In this embodiment, one or more operating systems (OS) 31 and/or one or more processes 32 may be executed, at least in part, by one or more host processors 12, circuitry 118, and/or I/O circuitry 119. When so executed, one or more OS 31 and/or one or more processes 32 may become resident, at least in part, in memory 21. In this embodiment, a value may be "predetermined" if the value, at least in part, and/or one or more algorithms, operations, and/or processes involved, at least in part, in generating and/or producing the value is predetermined, at least in part. Also, in this embodiment, a process, thread, daemon, program, driver, virtual machine, virtual machine monitor, operating system, application, and/or kernel each may (1) comprise, at least in part, and/or (2) result, at least in part, in and/or from, execution of one or more operations and/or program instructions. Although one or more processes 32 and one or more OS 31 are shown in the drawings as being distinct from each other, one or more processes 32 may be comprised, at least in part, in one or more OS 31, or vice versa, without departing from this embodiment.

In this embodiment, "circuitry" may comprise, for example, singly or in any combination, analog circuitry, digital circuitry, hardwired circuitry, programmable circuitry, co-processor circuitry, processor circuitry, controller circuitry, state machine circuitry, and/or memory that may comprise program instructions that may be executed by programmable circuitry. Also in this embodiment, a host processor, processor, processor core, core, and/or controller each may comprise respective circuitry capable of performing, at least in part, one or more arithmetic and/or logical operations, such as, for example, one or more respective central processing units. Also in this embodiment, a chipset may comprise circuitry capable of communicatively coupling, at least in part, two or more of the following: one or more host processors, storage, mass storage, one or more nodes, and/or memory. In this embodiment, a portion, subset, or fragment of an entity may comprise all of, more than, or less than the entity.

Although not shown in the Figures, one or more hosts 10 may comprise a graphical user interface system. The not shown graphical user interface system may comprise, e.g., a respective keyboard, pointing device, and display system that may permit a human user to input commands to, and monitor the operation of, one or more hosts 10, one or more hosts 20, and/or system 100.

Memory 21 may comprise one or more of the following types of memories: semiconductor firmware memory, programmable memory, non-volatile memory, read only memory, electrically programmable memory, random access memory, flash memory, magnetic disk memory, optical disk memory, one or more random access memory cells, and/or other or later-developed computer-readable and/or writable memory. One or more machine-readable program instructions may be stored in circuitry 118, CB 110, CC 120, memory 21, and/or I/O circuitry 119. In operation of one or more hosts 10, these instructions may be accessed and executed by one or more host processors 12, one or more CS 15, I/O circuitry 119, and/or circuitry 118. When so executed by these components, these one or more instructions may result in these components performing operations described herein as being performed by these components of system 100.

I/O circuitry 119 may exchange data and/or commands with one or more host 20 via one or more links 50, in accordance with one or more communication protocols. For example, in this embodiment, these one or more protocols may be compatible with, at least in part, e.g., one or more Ethernet, Transmission Control Protocol/Internet Protocol (TCP/IP), and/or other protocols.

For example, one or more Ethernet protocols that may be utilized in system 100 may comply or be compatible with, at least in part, IEEE 802.3-2008, Dec. 26, 2008; IEEE 802.1Q-2005, May 19, 2006; IEEE 802.11a-1999, Feb. 11, 1999; IEEE 802.11b-1999, Feb. 11, 1999; IEEE 802.11g-2003, Oct. 20, 2003; and/or IEEE 802.11n-2009, Oct. 29, 2009. The TCP/IP protocol that may be utilized in system 100 may comply or be compatible with, at least in part, the protocols described in Internet Engineering Task Force (IETF) Request For Comments (RFC) 791 and 793, published September 1981. Many different, additional, and/or other protocols (including, for example, those stated above) may be used for such data and/or command exchange without departing from this embodiment (e.g., earlier and/or later-developed versions of the aforesaid, related, and/or other protocols).

In this embodiment, after, for example, a reset or other event of or in one or more hosts 10, system 100, one or more hosts 20, and/or communication via one or more links 50, etc., circuitry 118 and/or circuitry 119 (a) of one or more receivers 10 may determine, at least in part, whether to issue (via one or more links 50) one or more credits 150 to one or more senders 20 of one or more packets 62, and/or (b) circuitry 118' of one or more senders 20 may receive, at least in part, the one or more credits 150 via one or more links 50. For example, the execution of one or more processes 32 in one or more receivers 10 may result in circuitry 119 and/or 118 determining, at least in part, whether to issue (via one or more links 50) one or more credits 150 to one or more senders 20 of one or more packets 62. One or more credits 150 may be to grant permission, at least in part, to the one or more senders 20 to issue the one or more packets 62 to the one or more receivers 10. In this embodiment, a credit may comprise one or more packets that may indicate, specify, and/or result in, at least in part, grant of permission to transmit one or more other packets. Circuitry 119, circuitry 118, and/or one or more processes 32 may make the determination, at least in part, of whether to issue the one or more credits 150, based, at least in part, upon whether a time in which one or more receivers 10 may be in a relatively lower power state prior to the issuance of the one or more credits 150 may be at least sufficient to (e.g., greater than or equal to) provide at least a predetermined amount of reduction in power consumption (e.g., of the one or more receivers 10 and/or one or more components thereof). This relatively lower power state may be relative to a relatively higher power state of the one or more receivers 10 that may prevail at the time of the issuance of the one or more credits 150.

Figure 2:
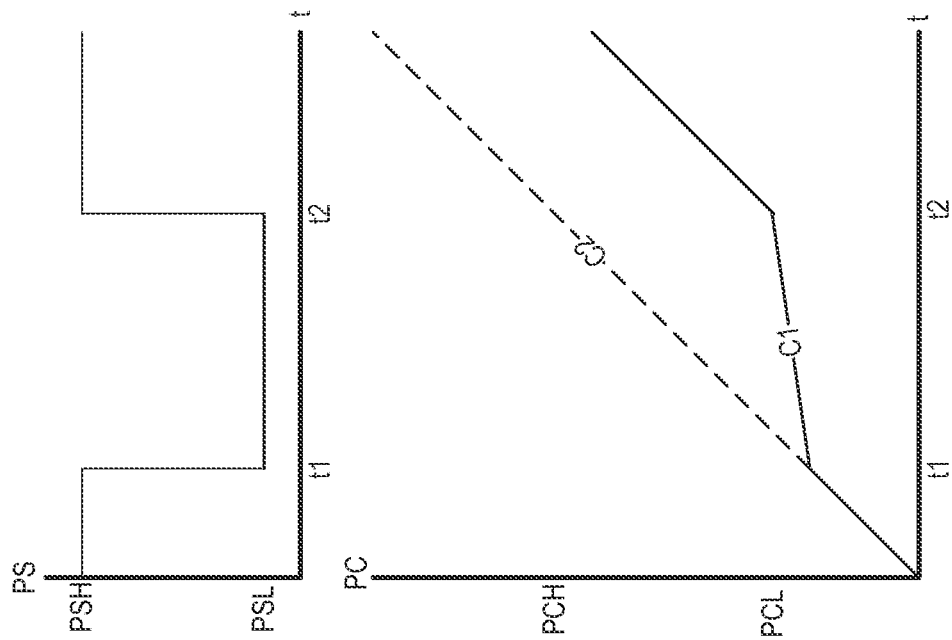
FIG. 2 illustrates features in an embodiment.

For example, as shown in FIG. 2, one or more receivers 10 may be capable of operating in multiple, mutually distinct and/or different power states (PS). Prior to time t1, one or more receivers 10 may operate in a relatively higher power state PSH, while after time t1, one or more receivers 10 may enter into and operate in a relatively lower power state PSL. At a later time t2 (e.g., t2>t1), one or more receivers 10 may re-enter the relatively higher power state PSH, and while one or more receivers 10 are again operating in that relatively higher power state PSH, one or more receivers 10 may issue one or more credits 150 to one or more senders 20.

Although in FIG. 2, for purposes of clarity of illustration, the respective times involved in transitioning from the relatively higher power state PSH to the relative lower state PSL, and vice versa, are shown as being essentially zero, it should be understood that, without departing from this embodiment, in actual implementation, these respective times may be non-zero. Likewise, without departing from this embodiment, although not shown in FIG. 2, each of the power states PSL, PSH may comprise multiple respective power states.

In this embodiment, relatively higher power state PSH may correspond, at least in part, to a fully operational and/or powered-up state of one or more receivers 10, one or more HP 12, CS 15, and/or circuitry 119 (e.g., suitable for packet reception and/or transmission). However, the relatively lower power state PSL may correspond, at least in part, to one or more sleep, suspend, and/or other relatively low power states (e.g., relative to the fully operational and/or powered-up state) of one or more receivers 10, one or more HP 12, CS 15, and/or circuitry 119 (e.g., unsuitable for packet transmission and/or reception). Accordingly, the power consumption (PC) rate (e.g., the slope of the curve C1, which represents the actual power consumption of one or more receivers 10 in this example) may decrease at time t1 (1) compared to what it was prior to time t1, and (2) compared to what it would have continued to be (e.g., the slope of the curve C2, which represents what the power consumption of one or more receivers 10 would have been in this example without the change in power state), but for the entry into and/or operation in the relatively lower power state PSL. The actual power consumption rate may continue in this manner (see curve C1) until time t2. However, at and after time t2, in this example, the power consumption rate (see slope of curve C1) may return to what it was prior to time t1. Accordingly, in this example, at time t2, the actual power consumption of one or more receivers 10 may be equal to power consumption PCL, which may be relatively lower than the relatively higher power consumption (e.g., power consumption PCH) that would have resulted if the entry into and/or operation in the relatively lower power state PSL had not occurred.

In this embodiment, the time t2 may correspond, at least in part, to the time at which circuitry 119 of one or more receivers 10 may issue one or more credits 150 to one or more senders 20 via one or more links 50. In this embodiment, circuitry 118, circuitry 119, and/or one or more processes 32 may determine, at least in part, whether to issue and/or the time t2 of issuance of one or more credits 150, based at least in part upon whether the time (e.g., t2 minus t1) in which one or more receivers 10 is in the relatively lower power state PSL, prior to the time t2 at issuance of the one or more credits 150, is at least sufficient to provide at least a predetermined amount of reduction in power consumption (e.g., of one or more receivers 10). For example, if, in this embodiment, the predetermined amount of reduction in power consumption is less than or equal to power consumption PCH minus power consumption PCL (i.e., predetermined amount of reduction in power consumption≤PCH−PCL), then circuitry 118, circuitry 119, and/or one or more processes 32 may select the time t2 (or a time thereafter) to re-enter the relatively higher power state PSH and to issue one or more credits 150. In this example, circuitry 118, circuitry 119, and/or one or more processes 32 may so select time t2 because this may be at least sufficient to provide an actual amount of reduction in power consumption that is greater than or equal to this predetermined amount of reduction in power consumption.

In this embodiment, one or more senders 20 may be permitted to issue to one or more receivers 10 one or more packets only when and/or if the one or more senders 20 have been granted a corresponding number of credits by one or more receivers 10. Put another way, one or more senders 20 may issue to one or more receivers 10 only the number of packets and/or amount of packet data that one or more receivers 10 have specifically granted unexpired permission to one or more senders 20 to issue, as specified and/or indicated by one or more credits 150.

Figure 4:
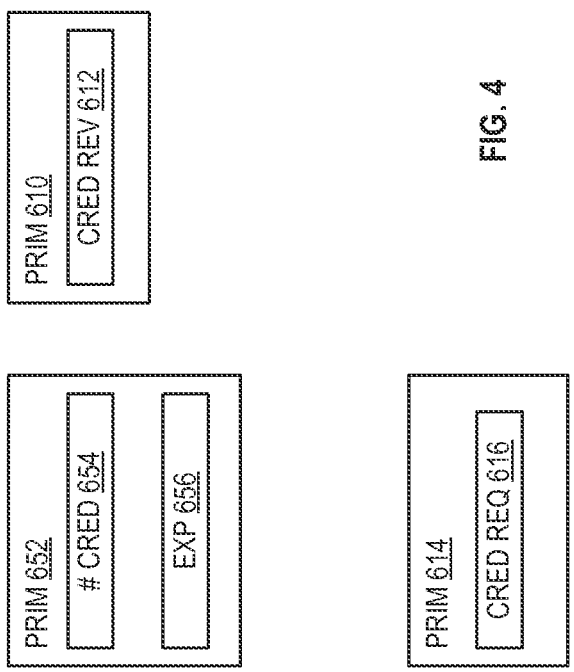
FIG. 4 illustrates features in an embodiment.

For example, in this embodiment, as shown in FIG. 4, one or more credits 150 may be issued by circuitry 119 of one or more receivers 10 in the form of, using, and/or comprising one or more primitives 652. In this embodiment, a primitive may be, comprise, specify, and/or indicate, at least in part, one or more requests, commands, and/or grants. In this embodiment, one or more primitives 652 may indicate a number of credits 654 and/or one or more expiration times 656 of the one or more credits being granted by and/or as a result of the one or more primitives 652. Each of the credits indicated by the number of credits 654 may correspond to and/or be associated with a respective number of packets and/or a respective amount of packet data that the intended recipient (e.g., one or more senders 20) may be granted permission by one or more primitives 652 to issue to one or more receivers 10. Accordingly, one or more primitives 652 may permit and/or grant one or more senders 20 to issue, until expiration of the one or more expiration times 656, the respective numbers of packets and/or amounts of packet data associated with the number of credits 654.

Advantageously, in this embodiment, by appropriately determining whether to issue one or more credits 150, the time t2 of issuance of one or more credits 150, the number of credits 654 being issued, and/or the one or more expiration times 656, circuitry 119, circuitry 118, and/or one or more processes 32 may coalesce (e.g., in one or more bursts) the packet issuances from one or more senders 20 to one or more receiver 10, and the credit issuances from one or more receivers 10 to one or more senders 20, thereby enlarging and/or extending the time periods between such issuances. Advantageously, each of these respective time periods may be selected by circuitry 119, circuitry 118, and/or one or more processes 32 to be (1) sufficiently long to permit one or more receivers 10 to enter into and remain in the relatively lower power state PSL, and (2) at least sufficient to provide the respective predetermined amount of reduction in power consumption. Advantageously, this may significantly reduce the amount of power consumed in and/or by one or more receivers 10, one or more senders 20, and/or system 100. Further advantageously, this also may improve the packet processing efficiency of one or more receivers 10, one or more senders 20, and/or system 100.

Additionally or alternatively, in this embodiment, the determination by circuitry 118, circuitry 119, and/or one or more processes 32 of whether to issue, and/or of the time t2 at which to issue, one or more credits 150 may be based, at least in part, upon (1) quality of service (QOS, illustrated symbolically by item 402 in FIG. 1) that may be associated, at least in part, with delivery of the one or more packets 62 and/or (2) one or more patterns 63 of previous network traffic 60 that may be comprised, in whole or in part, in network traffic 58. For example, one or more packets 62 may be associated, at least in part, with one or more QOS parameters that may comprise, specify, and/or identify, directly or indirectly, acceptable delay (illustrated symbolically by item 404, and may involve, e.g., maximum and/or average permitted delay) for delivery and/or issuance of one or more packets 62. Circuitry 118, circuitry 119, and/or one or more processes 32 may determine and/or select, at least in part, time t2 and/or whether to issue one or more credits 150 in such as a way that these one or more QOS parameters may be satisfied by the resulting generation, issuance, and/or delivery of one or more packets 62 (e.g., so as to avoid exceeding the acceptable delay).

Also, for example, prior to generation and/or issuance of one or more packets 62 by one or more senders 20, one or more senders 20 may generate and/or issue, at least in part, one or more other packets 64 to one or more receivers 10, in accordance and/or in conformance with, at least in part, one or more patterns 63. Circuitry 119, circuitry 118, and/or one or more processes 32 may observe these one or more network traffic patterns 63, and may adjust time t2 and/or whether to issue one or more credits 150, based at least in part upon these one or more observed patterns 63. For example, if the one or more observed patterns 63 indicate that previous packet traffic 60 and/or one or more packets 64 were issued by one or more senders 20 and/or received by one or more receivers 10 relatively fast (e.g., in relatively quick succession), then time t2 may be adjusted such that a resulting time interval between credit issuances may be relatively small (e.g., in order to accommodate what is likely to be continued relatively fast traffic embodied in one or more packets 62). Conversely, if the one or more observed patterns 63 indicate that previous packet traffic 60 and/or one or more packets 64 were so issued and/or received relatively slow (e.g., relative to previously described relatively fast traffic), then time t2 may be adjusted such that the resulting time interval between credit issuances may be relatively large (e.g., in order to reduce power consumption without likely significantly deleteriously affecting packet processing efficiency and/or latency). These one or more patterns 63 may be determined based at least in part, upon, one or more received packet counts (e.g., involving counting the number of packets 64 received per unit time, calculating one or more averages involving same, and/or using exponential moving average filters, etc.), illustrated symbolically by item 101 in FIG. 1.

Figure 3:
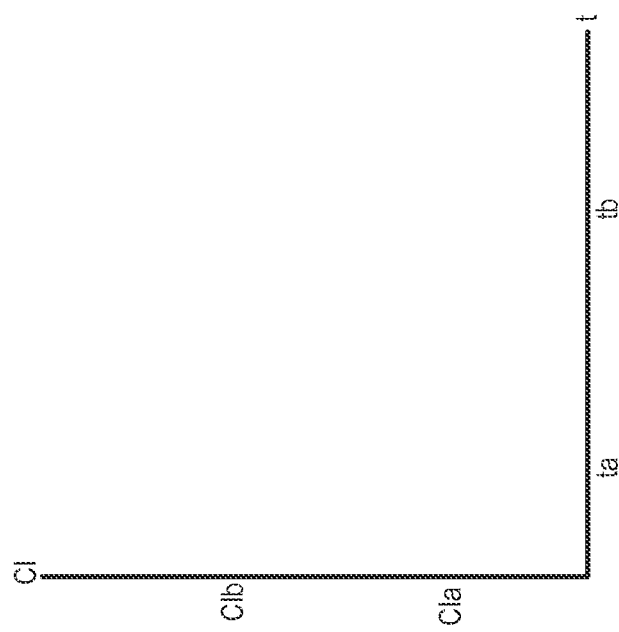
FIG. 3 illustrates features in an embodiment.

For example, as shown in FIG. 3, if a credit issuance CIa occurs at time ta, and a subsequent credit issuance CIb occurs at time tb, then circuitry 118, circuitry 119, and/or one or more processes 32 may adjust one or more of the times ta and/or tb so as to make the time interval between time ta and time tb relatively small if previous packet traffic 60 has been relatively fast. Conversely, for example, circuitry 118, circuitry 119, and/or one or more processes 32 may adjust one or more of the times ta and/or tb so as to make the time interval between time ta and time tb relatively large if the previous packet traffic 60 has been relatively slow.

In this embodiment, after issuing one or more credits 150, one or more receivers 10 may be capable of revoking, at least in part, one or more previously issued credits (e.g., one or more previous credits 150 that have been previously issued to one or more senders 20). For example, as shown in FIG. 4, one or more receivers 10 may be capable of issuing to one or more senders 20 one or more primitives 610 that may be, specify, indicate, and/or comprise one or more revocations 612 of one or more, some, and/or all of one or more previously issued credits. In response, at least in part, to one or more primitives 610, one or more senders 20 may revoke (e.g., void) these one or more previously issued credits 150.

Additionally or alternatively, in this embodiment, one or more senders 20 may be capable of requesting credit issuance by one or more receivers 10. For example, one or more senders 20 may request such credit issuance by issuing one or more primitives 614 to one or more receivers 10. One or more primitives 614 may be, specify, indicate, and/or comprise one or more requests 616 for such credit issuance. One or more requests 616 may specify, indicate, and/or define, at least in part, the number of credits that one or more senders 20 is requesting to be issued by one or more receivers 10. The issuance of one or more primitives 614 by one or more senders 20 may be in response, at least in part, to (1) receipt by one or more senders 20 of one or more relatively high priority packets (e.g., one or more packets 62 that may be of relatively high priority relative to one or more relatively lower priority packets 64), and/or (2) the exceeding by one or more senders 20 of buffer memory packet fill threshold 123 of buffer memory 122. The one or more relatively high priority packets 62 may comprise data whose value may depend significantly upon the timeliness and rapidity with it is delivered to its ultimate recipient, such as, for example, emergency and/or breaking financial news and/or requests intended to be executed and/or acted upon urgently. Threshold 123 may indicate a percentage of storage capacity of memory 122 that, when currently used to store packet data, may indicate that packet overflow and/or loss may occur soon, unless the memory 122 is flushed, at least in part (e.g., as a result of commencement of issuance of one or more packets presently stored therein), to provide further capacity to accommodate storage of additional packets. For example, when one or more senders 20 do not presently have any unexpired credits issued by one or more receivers 10, one or more senders 20 may temporarily store in buffer memory 122 one or more packets (e.g., generated and/or received by one or more senders 20) that may be intended for delivery to one or more receivers 10, until such threshold 123 is reached. In response, at least in part, to reaching this threshold 123, one or more senders 20 may issue one or more primitives 614 to one or more receivers 10. In response, at least in part, to one or more primitives 614, one or more receivers 10 may issue one or primitives 652 to one or more senders 20. In response, at least in part to receipt of the one or more credits 150 (e.g., as a result of one or more primitives 652), one or more senders 20 may issue one or more packets 62 to one or more receivers 10.

The above techniques of this embodiment may be employed to advantage in environments that use one or more conventional network communication protocols that do not otherwise utilize credit-based flow control, without modifying such network communication protocols. Additionally or alternatively, the techniques of this embodiment may be employed as an adjunct to one or more flow control mechanisms used in other conventional network communication protocols that utilize such flow control mechanisms.

Additionally or alternatively, if one or more senders 20 comprise multiple senders, one or more receivers 10 may issue one or more credits to the multiple senders during the same time window. Advantageously, this may permit receipt of packets from the multiple senders to be substantially coalesced within an expected time window, despite there being multiple senders within system 100. Advantageously, this also may permit one or more receivers 10 to be able to enter the relatively low power state (e.g., after receiving any corresponding packets from the multiple senders and/or expiration of the issued credits) for an extended period of time, despite there being multiple senders, and without substantial risk that one or more packets may be issued to the one or more receivers 10 while one or more receivers 10 are in the relatively low power state.

Additionally or alternatively, without departing from this embodiment, the above techniques may be employed to advantage within, for example, a single host 10. In this arrangement, host 10 may comprise one or more interconnects and/or fabrics 121 that may communicatively couple, for example, circuit board 110 and circuit card 120. In this arrangement, circuit board 110 may be or comprise one or more senders, and circuit card 120 may be or comprise one or more receivers, respectively, of one or more packets 62, via one or more interconnects 121. The above-described techniques of this embodiment may be employed by one or more components (e.g., in the role of one or more receivers of one or more packets 62) of circuit card 120 to issue one or more credits 150 to one or more components (e.g., in the role of one or more senders of one or more packets 62) of circuit board 110 to grant permission to issue one or more packets 62.

Thus, an embodiment may include circuitry to determine whether to issue at least one credit to at least one sender of at least one packet. The at least one credit may be to grant permission to the at least one sender to issue the at least one packet to at least one receiver of the at least one packet. The determination of whether to issue the at least one credit may be based, at least in part, upon whether a time in which the at least one receiver is in a relatively lower power state prior to issuance of the at least one credit is at least sufficient to provide at least a predetermined amount of reduction in power consumption. The relatively lower power state may be relative to a relatively higher power state of the at least one receiver that prevails at the issuance of the at least one credit. Additionally or alternatively, the circuitry may be to receive the at least one credit.

Advantageously, in this embodiment, one or more receivers 10 may be able to enter and/or remain in a relatively low power state (e.g., relative to a fully powered-on state that is suitable for receipt of transmissions) without risking and/or encountering transmission loss. Advantageously, in this embodiment, this may result in decreased power consumption and/or increased packet processing efficiency, without substantial risk of transmission loss.

This embodiment may embrace, contemplate, and/or employ essentially any credit-based and/or credit-utilizing system, mechanism, scheme, process, and/or technique that may result in the changing of and/or be based upon, at least in part, one or more power consumption characteristics. Accordingly, many modifications of the foregoing (and/or other techniques) are possible without departing from this embodiment.

For example, the principles of this embodiment may be used to advantage in a system that operates, at least in part, in accordance with IEEE 802.3az-2010 (Amendment to IEEE 802.3-2008), hereinafter "Energy Efficient Ethernet." In accordance with Energy Efficient Ethernet, a communication link may enter a relatively low power state when the link is idle, but the link may relatively rapidly re-enter a relatively high power state when packet traffic exists. If the principles of this embodiment are not employed, then the resulting packet traffic pattern in a system that employs Energy Efficient Ethernet may be relatively randomly disbursed and/or distributed in time, and accordingly, the link may transition relatively frequently between the two power states. Given that a significant amount of processing overhead may be involved in transitioning between the two power states, this may substantially counteract the power consumption savings intended to result from utilizing Energy Efficient Ethernet.

Advantageously, however, if the principles of this embodiment are employed in connection with Energy Efficient Ethernet, then what otherwise may be dispersed and/or random traffic may be coalesced (e.g., by appropriately issuing credits) in such a way as to permit the link to remain in the relatively low power state longer than would otherwise be the case. Advantageously, this may permit substantially greater power consumption savings to be obtained by employing the principles of this embodiment.

Many other and/or additional modifications are possible without departing from this embodiment. Accordingly, this embodiment should be viewed broadly as encompassing all such alternatives, modifications, and variations.

What is claimed is:

1. An apparatus comprising:
  circuitry capable of:
  determining, at least in part, whether to issue at least one credit to at least one sender of at least one packet, the at least one credit being to grant permission, at least in part, to the at least one sender to issue a specified amount of data and also being to specify an expiration time of the permission, the at least one sender being permitted to issue to the at least one receiver only a packet data amount that the at least one receiver has specifically granted unexpired permission, as specified by the at least one credit, to the at least one sender to issue, the determining of whether to issue the at least one credit being based, at least in part, upon whether a time in which the at least one receiver is in a relatively lower power state prior to issuance of the at least one credit is at least sufficient to provide at least a predetermined amount of reduction in power consumption, the relatively lower power state being relative to a relatively higher power state of the at least one receiver that prevails at the issuance of the at least one credit.

2. The apparatus of claim 1, wherein:
  the determining is also based, at least in part, upon:
  quality of service associated, at least in part, with delivery of the at least one packet; and
  one or more patterns of previous network traffic.

3. The apparatus of claim 2, wherein:
  the quality of service is associated, at least in part, with acceptable delay in the delivery of the at least one packet; and
  the determining is made so as to avoid exceeding the acceptable delay.

4. The apparatus of claim 2, wherein:
  the one or more patterns are determined based at least in part upon received packet count;
  and the determining is made such that time interval between credit issuances is relatively small if packet traffic has been relatively fast but is relatively large if the packet traffic has been relatively slow.

5. The apparatus of claim 1, wherein:
  a host is to comprise, at least in part, the circuitry;
  the host is to comprise the at least one receiver;
  another host is to comprise the at least one sender; and
  the at least one sender is to issue the at least one packet to the at least one receiver in response, at least in part, to receipt of the at least one credit from the at least one receiver.

6. The apparatus of claim 1, wherein:
  the at least one credit is issued using one or more primitives indicating a number of credits being issued and the expiration time, the one or more primitives permitting the at least one sender to issue, until expiration of the expiration time, a number of packets that is associated with the number of credits.

7. The apparatus of claim 1, wherein:
  the at least one receiver is capable of revoking one or more previous credits that have been previously issued to the at least one sender; and
  the at least one sender is capable of requesting credit issuance by the at least one receiver.

8. The apparatus of claim 7, wherein:
the at least one sender is to request the credit issuance in response, at least in part, to at least one of the following:
receipt by the at least one sender of at least one relatively high priority packet, the at least one relatively high priority packet being of relatively high priority relative to at least one relatively low priority packet; and
exceeding by the at least one sender of a buffer memory packet fill threshold.

9. A method comprising:
determining, at least in part, by circuitry whether to issue at least one credit to at least one sender of at least one packet, the at least one credit being to grant permission, at least in part, to the at least one sender to issue a specified amount of data and also being to specify an expiration time of the permission, the at least one sender being permitted to issue to at least one receiver only a packet data amount that the at least one receiver has specifically granted unexpired permission, as specified by the at least one credit, the determining being based, at least in part, upon whether a time in which the at least one receiver is in a relatively lower power state prior to issuance of the at least one credit is at least sufficient to provide at least a predetermined amount of reduction in power consumption, the relatively lower power state being relative to a relatively higher power state of the at least one receiver that prevails at the issuance of the at least one credit.

10. The method of claim 9, wherein:
the determining is also based, at least in part, upon:
quality of service associated, at least in part, with delivery of the at least one packet; and
one or more patterns of previous network traffic.

11. The method of claim 10, wherein:
the quality of service is associated, at least in part, with acceptable delay in the delivery of the at least one packet; and
the determining is made so as to avoid exceeding the acceptable delay.

12. The method of claim 10, wherein:
the one or more patterns are determined based at least in part upon received packet count; and
the determining is made such that time interval between credit issuances is relatively small if packet traffic has been relatively fast but is relatively large if the packet traffic has been relatively slow.

13. The method of claim 9, wherein:
a host is to comprise, at least in part, the circuitry;
the host is to comprise the at least one receiver;
another host is to comprise the at least one sender; and
the at least one sender is to issue the at least one packet to the at least one receiver in response, at least in part, to receipt of the at least one credit from the at least one receiver.

14. The method of claim 9, wherein:
the at least one credit is issued using one or more primitives indicating a number of credits being issued and the expiration time, the one or more primitives permitting the at least one sender to issue, until expiration of the expiration time, a number of packets that is associated with the number of credits.

15. The method of claim 9, wherein:
the at least one receiver is capable of revoking one or more previous credits that have been previously issued to the at least one sender; and
the at least one sender is capable of requesting credit issuance by the at least one receiver.

16. The method of claim 15, wherein:
the at least one sender is to request the credit issuance in response, at least in part, to at least one of the following:
receipt by the at least one sender of at least one relatively high priority packet, the at least one relatively high priority packet being of relatively high priority relative to at least one relatively low priority packet; and
exceeding by the at least one sender of a buffer memory packet fill threshold.

17. Non-transitory computer-readable memory storing one or more instructions that when executed by a machine result in performance of operations comprising:
determining, at least in part, whether to issue at least one credit to at least one sender of at least one packet, the at least one credit being to grant permission, at least in part, to the at least one sender to issue a specified amount of data and also being to specify an expiration time of the permission, the at least one sender being permitted to issue to at least one receiver only a packet data amount that the at least one receiver has specifically granted unexpired permission, as specified by the at least one credit, the determining being based, at least in part, upon whether a time in which the at least one receiver is in a relatively lower power state prior to issuance of the at least one credit is at least sufficient to provide at least a predetermined amount of reduction in power consumption, the relatively lower power state being relative to a relatively higher power state of the at least one receiver that prevails at the issuance of the at least one credit.

18. The computer-readable memory of claim 17, wherein:
the determining is also based, at least in part, upon:
quality of service associated, at least in part, with delivery of the at least one packet; and
one or more patterns of previous network traffic.

19. The computer-readable memory of claim 18, wherein:
the quality of service is associated, at least in part, with acceptable delay in the delivery of the at least one packet; and
the determining is made so as to avoid exceeding the acceptable delay.

20. The computer-readable memory of claim 18, wherein:
the one or more patterns are determined based at least in part upon received packet count; and
the determining is made such that time interval between credit issuances is relatively small if packet traffic has been relatively fast but is relatively large if the packet traffic has been relatively slow.

21. The computer-readable memory of claim 17, wherein:
a host is to comprise, at least in part, the circuitry;
the host is to comprise the at least one receiver;
another host is to comprise the at least one sender; and
the at least one sender is to issue the at least one packet to the at least one receiver in response, at least in part, to receipt of the at least one credit from the at least one receiver.

22. The computer-readable memory of claim 17, wherein:
the at least one credit is issued using one or more primitives indicating a number of credits being issued and the expiration time, the one or more primitives permitting the at least one sender to issue, until expiration of the expiration time, a number of packets that is associated with the number of credits.

23. The computer-readable memory of claim 17, wherein:
the at least one receiver is capable of revoking one or more previous credits that have been previously issued to the at least one sender; and the at least one sender is capable of requesting credit issuance by the at least one receiver.

24. The computer-readable memory of claim 23, wherein:
the at least one sender is to request the credit issuance in response, at least in part, to at least one of the following:
receipt by the at least one sender of at least one relatively high priority packet, the at least one relatively high priority packet being of relatively high priority relative to at least one relatively low priority packet; and
exceeding by the at least one sender of a buffer memory packet fill threshold.

25. An apparatus comprising:
circuitry to receive, at least in part, at least one credit, the at least one credit being to grant permission, at least in part, to at least one sender to issue a specified amount of data and also being to specify an expiration time of the permission, the at least one sender being permitted to issue to at least one receiver only a packet data amount that the at least one receiver has specifically granted unexpired permission, as specified by the at least one credit, determination of whether to issue the at least one credit further being based, at least in part, upon whether a time in which the at least one receiver is in a relatively lower power state prior to issuance of the at least one credit is at least sufficient to provide at least a predetermined amount of reduction in power consumption, the relatively lower power state being relative to a relatively higher power state of the at least one receiver that prevails at the issuance of the at least one credit.

26. The apparatus of claim 25, wherein:
the determination is also based, at least in part, upon:
quality of service associated, at least in part, with delivery of at least one packet; and
one or more patterns of previous network traffic.

27. The apparatus of claim 25, wherein:
a host is to comprise, at least in part, the circuitry;
the host is to comprise the at least one receiver;
another host is to comprise the at least one sender; and
the at least one sender is to issue at least one packet to the at least one receiver in response, at least in part, to receipt of the at least one credit from the at least one receiver.

28. The apparatus of claim 25, wherein:
the at least one credit is issued using one or more primitives indicating a number of credits being issued and the expiration time, the one or more primitives permitting the at least one sender to issue, until expiration of the expiration time, a number of packets that is associated with the number of credits.

29. The apparatus of claim 25, wherein:
the at least one receiver is capable of revoking one or more previous credits that have been previously issued to the at least one sender; and
the at least one sender is capable of requesting credit issuance by the at least one receiver.

30. The apparatus of claim 29, wherein:
the at least one sender is to request the credit issuance in response, at least in part, to at least one of the following:
receipt by the at least one sender of at least one relatively high priority packet, the at least one relatively high priority packet being of relatively high priority relative to at least one relatively low priority packet; and
exceeding by the at least one sender of a buffer memory packet fill threshold.

31. A method comprising:
receiving, at least in part, by circuitry, at least one credit, the at least one credit being to grant permission, at least in part, to at least one sender to issue a specified amount of data and also being to specify an expiration time of the permission, the at least one sender being permitted to issue to at least one receiver only a packet data amount that the at least one receiver has specifically granted unexpired permission, as specified by the at least one credit, determining whether to issue the at least one credit further being based, at least in part, upon whether a time in which the at least one receiver is in a relatively lower power state prior to issuance of the at least one credit is at least sufficient to provide at least a predetermined amount of reduction in power consumption, the relatively lower power state being relative to a relatively higher power state of the at least one receiver that prevails at the issuance of the at least one credit.

32. The method of claim 31, wherein:
the determining is also based, at least in part, upon:
quality of service associated, at least in part, with delivery of at least one packet; and
one or more patterns of previous network traffic.

33. The method of claim 31, wherein:
a host is to comprise, at least in part, the circuitry;
the host is to comprise the at least one receiver;
another host is to comprise the at least one sender; and
the at least one sender is to issue at least one packet to the at least one receiver in response, at least in part, to receipt of the at least one credit from the at least one receiver.

34. The method of claim 31, wherein:
the at least one credit is issued using one or more primitives indicating a number of credits being issued and the expiration time, the one or more primitives permitting the at least one sender to issue, until expiration of the expiration time, a number of packets that is associated with the number of credits.

35. The method of claim 31, wherein:
the at least one receiver is capable of revoking one or more previous credits that have been previously issued to the at least one sender; and
the at least one sender is capable of requesting credit issuance by the at least one receiver.

36. The method of claim 35, wherein:
the at least one sender is to request the credit issuance in response, at least in part, to at least one of the following:
receipt by the at least one sender of at least one relatively high priority packet, the at least one relatively high priority packet being of relatively high priority relative to at least one relatively low priority packet; and
exceeding by the at least one sender of a buffer memory packet fill threshold.

37. Non-transitory computer-readable memory storing one or more instructions that when executed by a machine result in performance of operations comprising:
receiving, at least in part, by circuitry, at least one credit, the at least one credit being to grant permission, at least in part, to at least one sender to issue a specified amount of data and also being to specify an expiration time of the permission, the at least one sender being permitted to issue to at least one receiver only a packet data amount that the at least one receiver has specifically granted unexpired permission, as specified by the at least one credit, determining whether to issue the at least one credit further being based, at least in part, upon whether a time in which the at least one receiver is in a relatively lower power state prior to issuance of the at least one credit is at least sufficient to provide at least a predetermined amount of reduction in power consumption, the relatively lower power state being relative to a relatively higher power state of the at least one receiver that prevails at the issuance of the at least one credit.

38. The computer-readable memory of claim 37, wherein:
the determining is also based, at least in part, upon:
quality of service associated, at least in part, with delivery of at least one packet; and
one or more patterns of previous network traffic.

39. The computer-readable memory of claim 37, wherein:
a host is to comprise, at least in part, the circuitry;
the host is to comprise the at least one receiver;
another host is to comprise the at least one sender; and
the at least one sender is to issue at least one packet to the at least one receiver in response, at least in part, to receipt of the at least one credit from the at least one receiver.

40. The computer-readable memory of claim 37, wherein:
the at least one credit is issued using one or more primitives indicating a number of credits being issued and the expiration time, the one or more primitives permitting the at least one sender to issue, until expiration of the expiration time, a number of packets that is associated with the number of credits.

41. The computer-readable memory of claim 37, wherein:
the at least one receiver is capable of revoking one or more previous credits that have been previously issued to the at least one sender; and
the at least one sender is capable of requesting credit issuance by the at least one receiver.

42. The computer-readable memory of claim 41, wherein:
the at least one sender is to request the credit issuance in response, at least in part, to at least one of the following:
receipt by the at least one sender of at least one relatively high priority packet, the at least one relatively high priority packet being of relatively high priority relative to at least one relatively low priority packet; and
exceeding by the at least one sender of a buffer memory packet fill threshold.

\* \* \* \* \*